INVENTOR.
WILLIS G. WING
BY
ATTORNEY

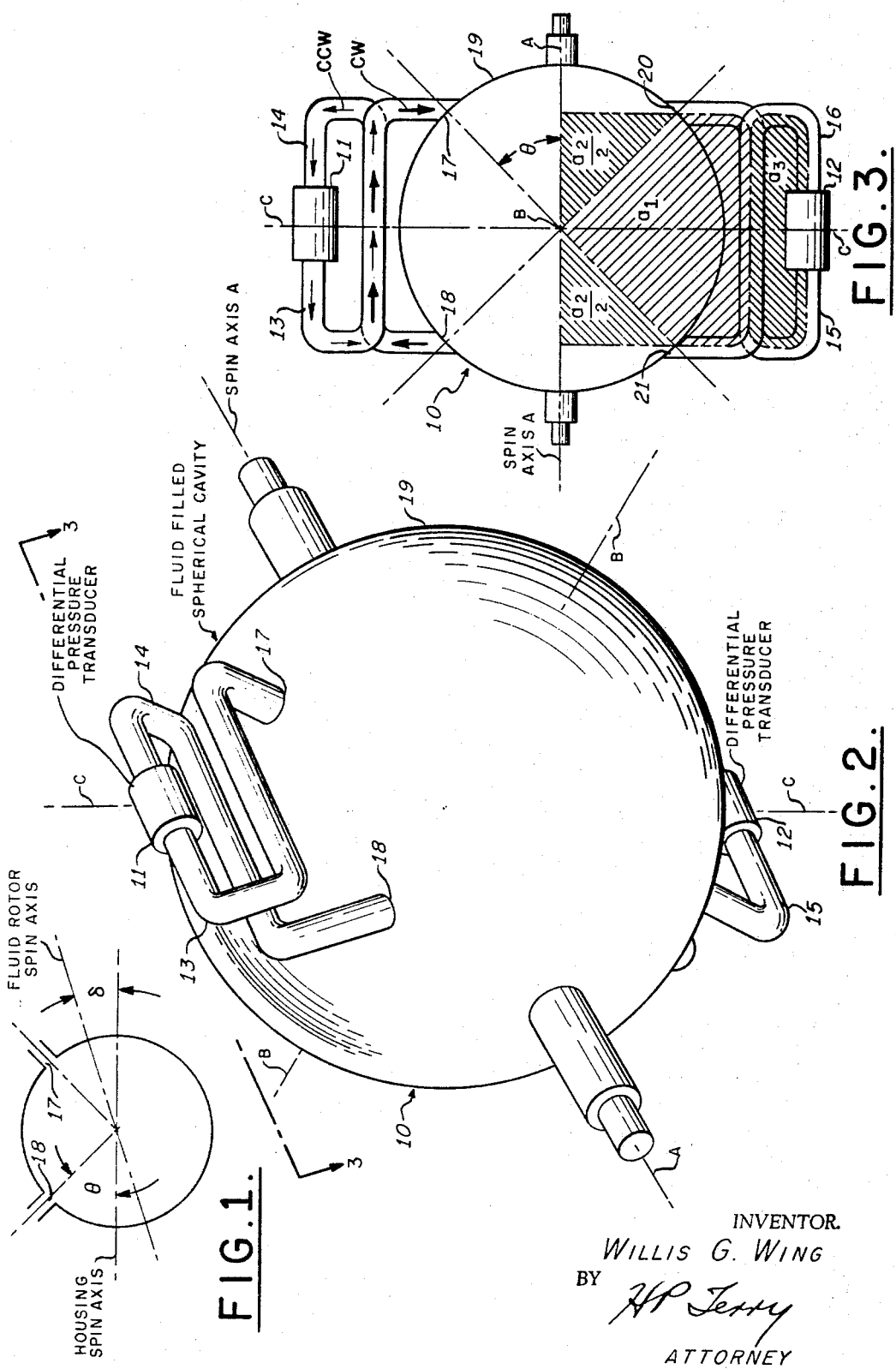

United States Patent Office 3,430,501
Patented Mar. 4, 1969

3,430,501
COMPENSATION APPARATUS FOR INERTIAL
DEVICES
Willis G. Wing, Glen Head, N.Y., assignor to Sperry
Rand Corporation, Great Neck, N.Y., a corporation
of Delaware
Filed July 21, 1965, Ser. No. 473,771
U.S. Cl. 74—5.6      8 Claims
Int. Cl. G01c 19/28

ABSTRACT OF THE DISCLOSURE

A fluid rotor gyroscope having apparatus that compensates for undesirable effects due to angular acceleration and angular vibration.

---

The invention herein described was made in the course of or under a contract or subcontract thereunder, with the Department of the Navy.

The present invention is concerned with compensating for undesirable effects in gyroscopic apparatus, particularly undesirable effects relating to fluid pick-offs and inductive devices associated with gyroscopic apparatus.

A gyroscope having a rotating sensitive element in the form of a fluid sphere is disclosed in my U.S. Patent No. 3,058,359 entitled Fluid Rotor Gyroscopic Apparatus issued Oct. 16, 1962 and assigned to the same assignee as the present invention. In said U.S. Patent 3,058,359, the fluid rotor gyroscope is discussed in terms of the differential pressure created between points at the surface of a body of liquid contained in a substantially spherical cavity when this fluid body is spun by means of spinning its containing cavity and under the conditions where the spin axis of the cavity is not parallel to the spin axis of the fluid body. As disclosed in that patent, the resultant pressure is due to centrifugal effects within the fluid body and the differential pressure can be sensed by pressure transducers placed in passages which communicate with the cavity at the points where it is desired to sense the pressure.

It has been determined that additional pressures are created in the passages which connect the pressure transducers to the sensing ports which add to the aforementioned centrifugally produced pressure and are thus also sensed by the pressure transducers. These additional pressures have as their sources the effects of angular acceleration of the device and angular velocity of the device (both about axes in the plane normal to the spin axis).

It has been found that the pressure created due to angular acceleration of the gyroscope can be highly objectionable in certain applications but that proper design of the passages can effectively eliminate this pressure.

It has further been found that proper proportioning of the passages can be provided which greatly attenuates drift error which can result from angular vibration at twice spin frequency.

Both of these desirable results cannot be completely achieved simultaneously in the design of a passage but the designs are similar and the option exists to proportion the passages optimally for a particular application. However, the proper design for elimination of the angular acceleration effect markedly improves the error due to angular vibration at twice spin frequency and the proper design for elimination of error due to angular vibration at twice spin frequency markedly reduces the response to angular acceleration. In the event a design is chosen to eliminate the response to angular acceleration, provisions can be made to further reduce the error due to angular vibration at twice spin frequency by appropriate processing of the electrical signal.

As disclosed in said U.S. Patent No. 3,058,359, the fluid rotor gyroscope also utilizes magnetic rotary transformers or magnetic slip rings of the type shown in U.S. Patent No. 2,432,982 issued Dec. 23, 1947 to F. D. Braddon et al. entitled "Inductive Coupling."

The rotary transformers carry high frequency (10 kc. to 40 kc.) excitation for the pressure transducers from the nonrotating frame to the rotating member and bring the signal from the rotating member to the frame. The signal which is developed on the rotating member is a spin frequency modulation of the high frequency carrier (commonly, it is a single side band, suppressed carrier signal). An error results if any similar voltage is developed for any cause other than the effect of the alternating pressure acting on the transducer diaphragms.

One error comes from modulation of any unsuppressed carrier by the output rotary transformer at spin frequency or modulation of the input carrier by the input rotary transformer; either of these can result in a signal which is indistinguishable from the normal signal and, hence, a source of drift error. Modulation by the rotary transformers can occur either because the coupling coefficient between stator and rotor varies with angle or because the input impedance varies with angle; in the latter case modulation will occur only if there is a non-zero source impedance for the input to the particular transformer.

One possible solution to this problem would be very accurate balancing of the bridge circuits of the pressure transducers. Such balancing completely suppresses the carrier so that no false signal results due to modulation in the output transformer (only harmonic distortion of the signal would result) and any modulation of the carrier by the input transformer is also eliminated by this accurate bridge balance. However, it is very difficult to obtain the required quality of electrical balance on the rotating assembly, and it is even more difficult to retain such balance if actually achieved.

By using additional circuit elements on the stator in accordance with the present invention, the same result is achieved as if perfect balance existed on the rotor. This is accomplished by utilizing a tertiary winding having two parts, one part being tightly coupled such as by means of a bifilar coil and another part being loosely coupled with the two parts being connected to oppose each other.

It is a primary object of the present invention to provide an improved gyroscopic apparatus having minimum random drift error.

It is an additional object of the present invention to provide improved gyroscopic apparatus compensated for undesirable effects associated with its pick-offs.

It is a further object of the present invention to provide compensation for undesirable effects associated with fluid pick-offs particularly in gyroscopic apparatus.

It is another object of the present invention to provide compensation for undesirable effects associated with rotary transformers.

These and other objects of the present invention will become apparent by referring to the drawings wherein like reference numerals indicate like elements;

FIG. 1 is a schematic view in section of a fluid rotor gyroscope showing the rotor cavity, the relative position of the housing spin axis, the fluid rotor spin axis and the sensing ports;

FIG. 2 is an isometric drawing of the rotor cavity defining member showing the pressure transducers connected by tubes to the sensing ports in the member;

FIG. 3 is a sectional view of FIG. 2 taken along the line 3—3;

Figure 4:
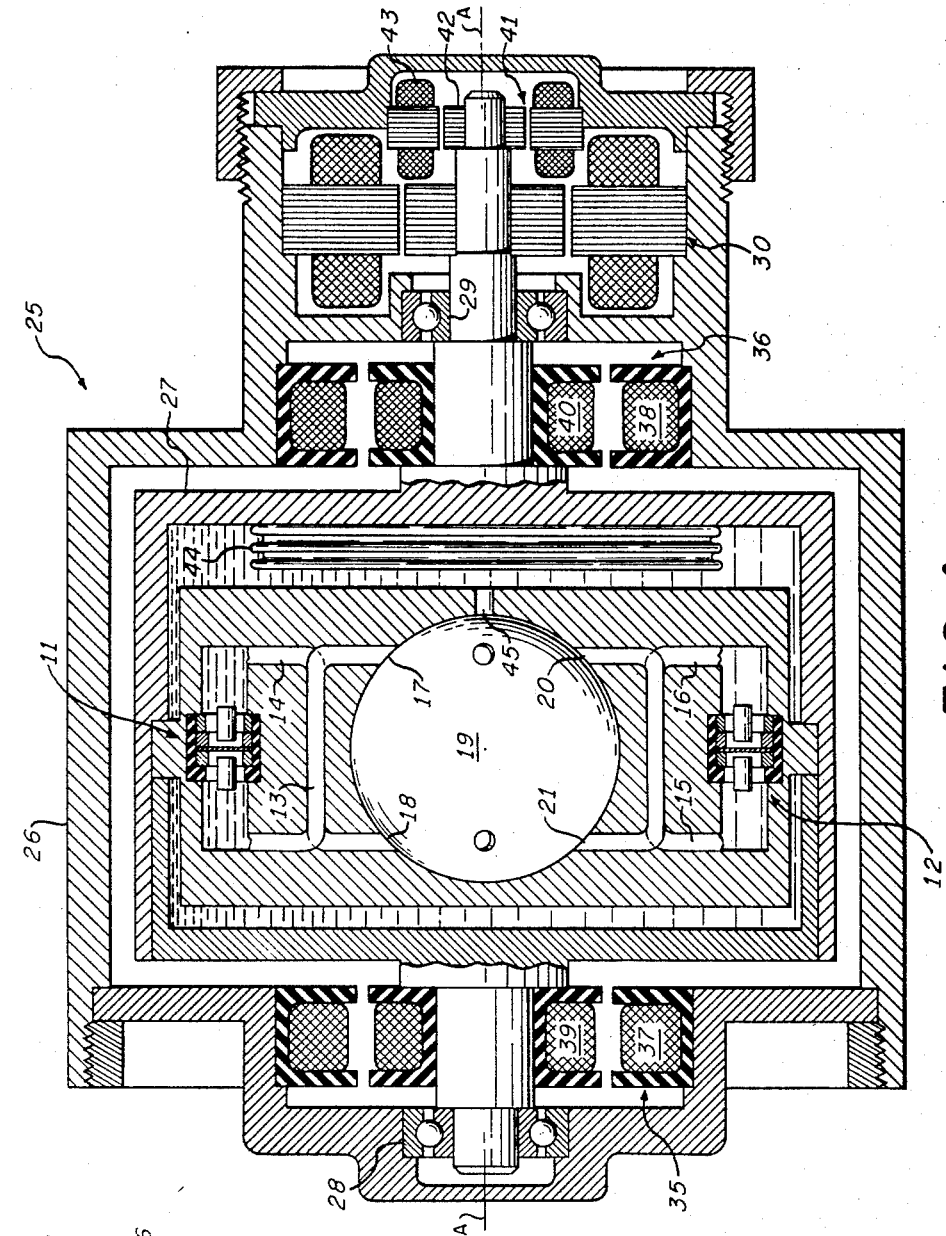
FIG. 4 is a cross sectional view of a fluid rotor gyroscope incorporating the present invention.

In accordance with the present invention to compensate for the angular acceleration and the angular vibration at twice spin frequency errors, it is necessary to depart from the specific pressure sensing port arrangement shown in said U.S. Patent 3,058,359 and to use instead the arrangement shown in FIG. 2 for the reasons given below.

The pressure which is sensed results from centrifugal forces in the fluid and is given by:

$$P = 2\rho\Omega^2 R^2 \sin\theta \cos\theta \, \delta \sin(\Omega t + \phi) \quad (1)$$

where:
P=pressure (dynes per cm.²)
$\rho$=fluid density (grams/cc.)
$\Omega$=spin speed in radians per second
R=radius of sphere (cm.)
$\theta$=colatitude angle of ports
$\delta$=deflection angle in radians (small angle)
$\phi$=indicates space orientation of axis of deflection The above expression for pressure can, of course, be written as:

$$P = K\delta \sin(\Omega t + \phi) \quad (2)$$

and further examined for the particular case in which $\delta$ is oscillatory and given by:

$$\delta = \delta_0 \sin \omega t$$
$$P = K\delta_0 \sin \omega t \sin(\Omega t + \phi) \quad (3)$$

which is identically equal to:

$$P = \frac{K\delta_0}{2}[\cos(\omega t - \Omega t - \phi) - \cos(\omega t + \Omega t + \phi)] \quad (4)$$

and is the familiar side band representation of a modulated carrier. In the particular case where $\omega = 2\Omega$, it is found that the pressure is given by:

$$P = \frac{K\delta_0}{2}[\cos(\Omega t - \phi) - \cos(3\Omega t + \phi)] \quad (5)$$

and it is noted that the lower side band pressure has the same frequency as the pressure for a steady angle as an input. It thus turns out that a drift error is caused by an input angular vibration at a frequency equal to twice the spin frequency, as was previously stated.

The basic form of passage of the present invention is shown in FIG. 2 which is an isometric drawing of a housing 10 carrying pressure transducers 11 and 12 connected by tubes 13, 14 and 15, 16, respectively to respective sensing ports 17, 18 and 20, 21 that communicate with a rotor defining cavity 19 as shown more clearly in FIG. 3. The elements 16, 20 and 21 cannot be seen in FIG. 2. It will be noted that the tubes 13, 14, 15 and 16 do not follow the most direct possible route from ports to transducer but, instead, are formed essentially into a figure 8. FIGURE 3 which is a sectional view taken along line 3—3 of FIG. 2 shows the form of the tubes 13, 14, 15 and 16 more clearly. FIG. 3 also serves to identify certain projected areas $a_1$, $a_2$ and $a_3$, enclosed by centerlines of tubes and sphere, which are useful in the mathematical treatment of the problem. The area $a_1$ may be defined as substantially the projected area enclosed when starting from the center of the fluid rotor and extending radially to the centerlines of the ports, for example 20 and 21 and continuing along the centerlines of the tubes 15 and 16 to and including where the tubes 15 and 16 overlap to form the innermost portion of the figure 8. The area $a_2$ is equal to $R^2 \sin\theta \cos\theta$ and is equally divided on each side of $a_1$. The area $a_3$ may be defined as substantially the area enclosed by a planar projection of the centerlines of the tubes 15 and 16 forming the outermost portion of the figure 8. As shown in FIG. 3 with respect to tubes 13 and 14, when the fluid flow associated with the area $a_1$, tends to be in a clockwise direction, for example, as shown by the heavy arrows while the fluid flow associated with the area $a_3$ tends to be in an opposite or counterclockwise direction as shown by the light arrows.

To understand how the pressure due to angular acceleration is related to the areas $a_1$ and $a_3$ of FIGURE 3 it should first be noted that angular vibration of the assembly about any arbitrary axis can be considered as the superposition of a translational vibration of the sphere and an angular vibration about the sphere center. Because the sphere and passages are completely filled with fluid, there is no net pressure about the complete loop (including passages and sphere itself) due to the translational vibration and only angular vibration about the sphere center needs to be considered.

Let us now consider whether there can be any pressure contribution from the fluid in the spherical cavity due to angular vibration about the sphere center. If it is assumed that the fluid inertia prevents it from having the same angular vibration as the cavity walls it is evident that there is no pressure between the ports 20 and 21 at the vibration frequency due to the fluid in the spherical cavity; at relatively high vibration frequencies this is essentially the condition to be expected. If the fluid body does, due to viscous shear coupling, have an angular vibration it is seen that there is no hydrostatic pressure involved, there is only the shear stress parallel to the surface of the cavity. As a minor exception to this last statement, it is seen that some centrifugally induced pressure will be produced by the angular velocity of the fluid body but this will be the same at the ports 20 and 21 and will result in no net differential pressure. It is now evident that any net angular acceleration induced pressure on the diaphragm of pressure transducer 12 must be the result of acceleration of fluid within the passages due to angular acceleration about the center of the sphere.

If, then, the effect of angular acceleration about the sphere center on fluid in the passages is considered it should be noted that the pressure transducer diaphragm forces the fluid to move with the passage (with only a negligible relative motion due to diaphragm deflection). Let us consider the passage as being made of two sections formed by cutting the two tubes whose centerlines separate $a_1$ from $a_3$; the cuts will be by a plane normal to axis AA and containing axis CC. It is evident that the total pressure around the passage is the sum of pressures in those two sections.

In any incremental length of tube defined by an increment of angle $(d\gamma)$ measured at the center of the sphere, the linear acceleration due to an angular acceleration $(\ddot{\beta})$ is $R\ddot{\beta}$ where R is the radius from the sphere center to the point in the tube being considered (because the tube diameters are small the approximation is made that only the centerline radius needs to be considered). If, at the point being considered, the tube centerline is at an angle $\psi$ to the radius of the sphere, there will be an incremental length of tube subtended by the angle $d\gamma$ which is $Rd\gamma/\sin\psi$ and the component of linear acceleration along the tube centerline is $R\ddot{\beta}\sin\psi$. For a fluid density $\rho$, the increment of pressure along the increment of tube length is then:

$$dP = \rho(R\ddot{\beta}\sin\psi)\left(\frac{Rd\gamma}{\sin\psi}\right) = \rho R^2\ddot{\beta}d\gamma$$

or $dP = 2\rho\ddot{\beta}dA$ where $dA$ is the increment of area enclosed by the two radii separated by the angle $d\gamma$ and by the increment of tube length subtended by the angle $d\gamma$.

We thus find that the pressure around any loop of tube is given by $P = 2\rho\ddot{\beta}\int dA$ or $2P\ddot{\beta}A$. For the portion of the passage inside the tube centerlines separating $a_1$ from $a_3$ it is seen that the $\int dA = a_1$, while outside these centerlines the $\int dA$ is $a_3$. It has also been noted that the total pressure due to angular acceleration is the sum of the pressures in these two passage sections.

As has been indicated, the axis about which angular acceleration occurs can be arbitrary. For the purpose of comparing the signs of the pressures due to the portions of the passage defined by $a_1$ and by $a_3$, consider each, in turn, with the axis lying within the area. When this is done it is seen that, in terms of effect at the diaphragm of the pressure transducer, they are opposing. The net pressure at the diaphragm due to angular acceleration is, then:

$$P = 2(a_3 - a_1)\rho\ddot{\beta}$$

In addition to the above discussed pressure in the passages due to angular acceleration there is a component of pressure in the passages due to angular velocity about axis CC. This pressure is due to coriolis acceleration on the fluid in the passages. Coriolis acceleration results when translational velocity occurs in a rotating device (the term coriolis acceleration is most commonly used to describe the effect of following a great circle on the rotating earth). Coriolis acceleration is given by: $a = 2\dot{\beta} \times V$ where $\dot{\beta}$ is the angular velocity and V the translational velocity.

If in the gyroscope being considered, the translational velocity of a fluid particle in a passage is considered as being the result of the spin, it will be given by $V = R\Omega$. The coriolis acceleration is then $a = 2\dot{\beta}R\Omega$ where $\dot{\beta}$ is the angular velocity about axis CC; the coriolis acceleration is found to be parallel to the spin axis of the device. The increment of pressure in the passage is then given by:

$$dP = 2\rho\dot{\beta}R\Omega dl$$

where $dl$ is the increment of distance along the spin axis.

$$P = 2\rho\dot{\beta}\Omega \int R dl$$

For the portion of the passage inside the centerlines separating $a_1$ and $a_3$ this gives a component of pressure:

$$P = 2\rho\dot{\beta}\Omega(a_1 + a_2)$$

For the portion of the passage outside the centerlines separating $a_1$ and $a_3$ this gives a component of pressure $$P = 2\rho\dot{\beta}\Omega a_3$$

The influence of the pressure due to $a_3$ is opposite that due to $(a_1 + a_2)$, when considered at the transducer diaphragm, so that the net pressure due to coriolis acceleration is:

$$P = 2\rho\dot{\beta}\Omega(a_3 - a_1 - a_2)$$

The pressure sources above discussed have been examined based on rotations about axes attached to the spinning assembly. In the following Equation 6 they have been modified (by multiplications by sine and cosine of the spin angle) to account for angular motions about a space fixed axis. In other words, the angular acceleration and velocity components appearing on the axes attached to the rotating assembly are components of the corresponding values about the spaced fixed axis.

Based on the areas defined in FIG. 3 the following expression defines completely the pressures which have been discussed above.

$$P = 2\rho\Omega^2 R^2 \sin\theta \cos\theta\, \delta \sin(\Omega t + \phi)$$
$$+ 2(a_3 - a_1)\rho\ddot{\beta} \sin(\Omega t + \phi) \quad (6)$$
$$+ 2(a_3 - a_1 - a_2)\rho\dot{\beta}\Omega \cos(\Omega t + \phi)$$

As explained above, $\dot{\beta}$ and $\ddot{\beta}$ are the first and second time derivatives of the angle of the device of FIG. 2 as measured about a fixed axis (nonrotating) which is coaxial with axis B—B at zero time.

Because the effects of the second and third terms of Equation 6 are of interest only at relatively high frequencies, the $\delta$ of that equation can be replaced by $\beta$ without significant error.

$$P = \rho\Omega^2\beta_0[2a_1 - R^2 \sin\theta \cos\theta] \cos(\Omega t - \phi)$$
$$+ 2(a_3 - a_1)\rho\ddot{\beta} \sin(\Omega t + \phi) \quad (7)$$
$$+ 2(a_3 - a_1 - a_2)\rho\dot{\beta}\Omega \cos(\Omega t + \phi)$$

Those versed in the art of servo design will realize from an inspection of Equation 7 that unless the second term is made equal to zero $(a_3 = a_1)$ the stabilization of a servo loop incorporating the gyroscope would be very difficult. One of the passage proportions previously discussed (that for elimination of angular acceleration sensitivity) is, then, defined by the condition $a_3 = a_1$ and this is a desirable condition for use in servo loops.

Equation 7 can also be examined for the input:

$$\beta = \beta_0 \sin 2\Omega t$$

which is the angular vibration at twice spin frequency which has been previously discussed. If this expression for $\beta$ is substituted into Equation 7 and only the lower sideband is considered (since this has been found previously to cause the error) the result is:

$$P = \rho\Omega^2\beta_0[R^2 \sin\theta \cos\theta + 4(a_1 - a_3)$$
$$+ 2(a_3 - a_1 - a_2)] \cos(\Omega t - \phi)$$

If it is noted that $a_2 = R^2 \sin\theta \cos\theta$ the above becomes:

$$P = \rho\Omega^2\beta_0[2a_1 - R^2 \sin\theta \cos\theta - 2a_3]\cos(\Omega t - \phi) \quad (8)$$

Evidently, this pressure will be zero if $a_3$ is so chosen that the expression in the brackets is zero or:

$$a_3 = a_1 - \tfrac{1}{2}R^2 \sin\theta \cos\theta \quad (9)$$

Because $a_3$ can be chosen completely at will, it is evident that the passage proportioning required to eliminate the error due to angular vibration at twice spin frequency is a possibility although it should be noted that the criterion is not the same as that for elimination of the angular acceleration sensitivity.

If it is now assumed that the passage is designed for the elimination of the angular acceleration term $(a_3 = a_1)$ the residual lower side band for angular vibration at twice spin frequency is found to be:

$$P = -\rho\Omega^2\beta_0 R^2 \sin\theta \cos\theta \cos(\Omega t - \phi)$$

which can be compared with the results for a design in which $a_3$ is zero:

$$P = \rho\Omega^2\beta_0[2a_1 - R^2 \sin\theta \cos\theta] \cos(\Omega t - \phi)$$

The ratio of these two expressions is:

$$-\frac{R^2 \sin\theta \cos\theta}{2a_1 - R^2 \sin\theta \cos\theta} \quad (10)$$

In a practical design with $\theta = 45°$, it is found that $a_1$ is of the order of $R^2$; using this value leads to a ratio of $-1/3$. It is thus found that an improvement in angular vibration error is obtained in the design which eliminates the angular acceleration response.

Examination of the converse case (the improvement to the angular acceleration sensitivity when the design is chosen for elimination of the error due to angular vibration at twice spin frequency) leads to an improvement ratio:

$$\frac{R^2 \sin\theta \cos\theta}{2a_1} \quad (11)$$

and for the same values of $\theta$ and $a_1$ used in evaluating Equation 10 the value is found to be 1/4.

In each passage configuration considered, it will be found that the pressure for a steady input is of the form:

$$P_1 = K_1\delta \sin(\Omega t + \phi) \quad (12)$$

while for an angular vibration input at twice spin frequency the lower side band is of the form:

$$P_2 = K_2 \beta_0 \cos (\Omega t - \phi) \quad (13)$$

If it is now assumed that an additional pressure transducer is employed located 90° (measured around the spin axis) from the first the corresponding expressions can be found by adding 90° to $\phi$ in each of the Equations 12 and 13.

$$P_1' = K_1 \delta \cos (\Omega t + \phi) \quad (14)$$

$$P_2' = -K_2 \beta_0 \sin (\Omega t - \phi) \quad (15)$$

Inspection of these equations shows that $P_1'$ leads $P_1$ by 90° while $P_2$ leads $P_2'$ by 90°; the phase rotation for the pressure due to angular vibration at twice spin frequency is thus found to be opposite that for the steady input. Use of pressure transducers at 90° intervals and signal processing in any way which discriminates against the undesired phase rotation can thus eliminate the error due to angular vibration at twice spin frequency.

It has been shown that the error due to angular vibration at twice spin frequency can be eliminated either by proper design of passages or by use of multiple pressure transducers and proper signal processing. Because the first method depends on an accurately reproducible passage geometry while the latter depends on accurate matching of electrical signals (in phase and amplitude) a much better cancellation is practically possible in the first way than in the second. In any event the degree of cancellation inherent in the passage geometry required for elimination of angular acceleration sensitivity represents an improvement which can be refined by the phase rotation discrimination.

Referring now to FIG. 4, a cross section of one embodiment of a fluid rotor gyroscope 25 incorporating the present invention is shown. The gyroscope 25 has a stationary housing 26 within which is a rotatable assembly 27 carried on bearings 28 and 29 for rotation about a spin axis A—A by a motor 30 which is preferably a polyphase induction or hysteresis motor. Magnetic rotary transformers or inductive slip rings 35 and 36 have their respective stators 37 and 38 mounted on the stationary housing 26 and their respective rotors 39 and 40 mounted on the rotatable assembly 27. The rotary transformers 35 and 36 may be generally of the type disclosed in U.S. Patent No. 2,432,982 issued Dec. 23, 1947 to F. D. Braddon et al. entitled Inductive Coupling. An electromagnetic alternator 41 is provided having its permanent magnet rotor 42 mounted on rotatable assembly 27 and its stator 43 mounted on the stationary housing 26.

Within the rotatable assembly 27 is the essentially spherical cavity 19 which communicates with opposite sides of the pressure transducer 11 through tubes or passages 13 and 14 via ports 17 and 18 respectively. The cavity 19 also communicates with opposite sides of the pressure transducer 12 through tubes or passages 15 and 16 via ports 20 and 21 respectively. Not shown in FIG. 4 are two additional pressure transducers and connecting passages, each displaced 90° from those shown. The tubes such as 13 and 14 connected to a transducer such as 11 in combination define a figure 8 configuration for the reasons explained above.

Also mounted on the rotatable assembly 27 is a fluid expansion bellows 44 which communicates with the cavity 19 through a passage 45.

Figure 5A:
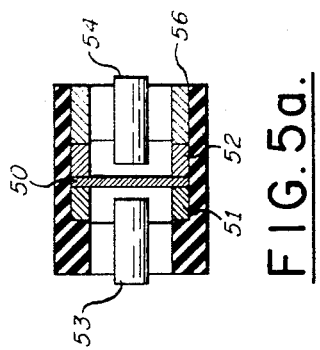
FIGS. 5a and 5b are enlarged views showing a typical pressure transducer.
Figure 5B:
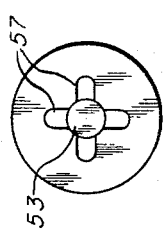

A typical transducer such as 11 is shown enlarged in FIGS. 5a and b. The transducer 11 consists of a thin metallic diaphragm 50 connected between mounting rings 51 and 52, metallic rods 53 and 54 which serve as stationary plates and an electrical insulating member 56 which holds the other parts in proper relationship. The device is essentially a capacitive microphone which operates on variations in the capacitance between the diaphragm 50 and stator 53 and that between the diaphragm 50 and stator 54 when motion of the diaphragm 50 occurs due to differential pressures in the fluid filled cavity 19. FIG. 5b shows typical apertures 57 through which fluid passes.

Figure 6:
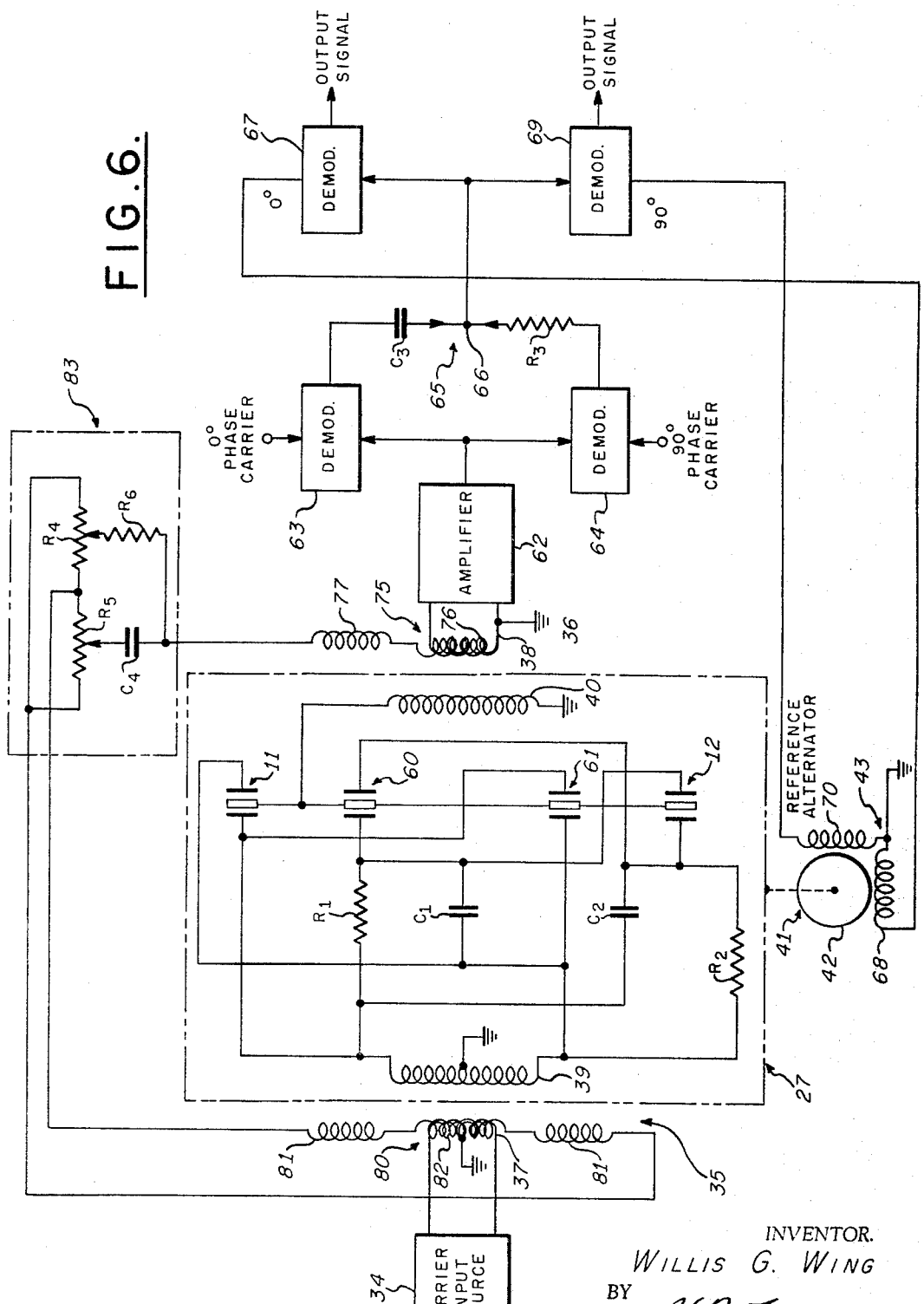
FIG. 6 is an electrical schematic wiring diagram of the fluid rotor gyroscope incorporating the present invention.

Referring now to FIG. 6, an embodiment of the electrical circuit associated with the improved fluid rotor gyroscope of the present invention is shown. A source 34 of alternating voltage at a relatively high frequency (for instance 10 kc.) is applied to the portions of the circuit on the rotatable assembly 27 by the rotary transformer or magnetic slip ring 35. The alternating voltage from the magnetic slip ring 35 is applied directly to the stator plates of the pressure transducers 11 and 12 and to the two remaining transducers 60 and 61 which are at 90° to transducers 11 and 12 through lattice networks comprised of resistor $R_1$, resistor $R_2$, capacitor $C_1$ and capacitor $C_2$ which provide an electrical phase shift of 90°. The outputs of all four transducers 11, 12, 60 and 61 are summed and applied to the rotor coil 40 of the magnetic slip ring 36. The output of the magnetic slip ring 36 from its stator coil 38 is applied to the input of an amplifier 62. With the circuit shown the variations in the amplitude of the zero angle phase of the high frequency voltage from the amplifier 62 are representative of the sum of the pressure variations acting on the transducers 11 and 12 while the variations in the amplitude of the 90° angle phase of the high frequency voltage from amplifier 62 are representative of the sum of the pressure variations acting on the transducers 60 and 61 located at 90° to transducers 11 and 12. The output of a phase sensitive demodulator 63 connected to be responsive to the output of amplifier 62 and 0° phase carrier signals is then a voltage representative of the sum of the pressure variations acting on transducers 11 and 12. The output of a phase sensitive demodulator 64 connected to be responsive to the output of amplifier 62 and 90° phase carrier signals is a voltage representative of the sum of the pressure variations acting on the transducers 60 and 61.

When the gyroscope 25 is in operation and is subjected to an input movement, the outputs of the demodulators 63 and 64 will be voltages varying at spin frequency and relatively in quadrature phase. As discussed above, the phase rotation will have one sense for a steady input and the opposite sense for the undesirable output resulting from an angular vibration input at twice spin frequency.

A summing network 65 connected to the demodulators 63 and 64 consisting of capacitor $C_3$ and resistor $R_3$ uses values so chosen as to make $\Omega R_3 C_3 = 1$. With this relationship the voltage at the junction 66 thereof will be the sum of the two demodulator outputs for one phase rotation and the difference between the two demodulator outputs for the opposite phase rotation. It is thus possible to discriminate against outputs resulting from angular vibration at twice spin frequency.

The voltage at the junction 66 of resistor $R_3$ and capacitor $C_3$ will be of the form $$E = K \delta \sin (\Omega t + \phi)$$

If $\phi$ is set equal to zero, this is the output resulting from input movement about one axis normal to the spin axis A—A, there will then be a corresponding DC output signal from a phase sensitive demodulator 67 connected to the junction 66 and to the 0° phase winding 68 of the reference alternator 41. If $\phi$ is set equal to 90°, this is the output resulting from input movement about an axis normal to the spin axis A—A and the above discussed input axis; there will, then, be a corresponding DC output signal from a phase sensitive demodulator 69 connected to the junction 66 and to the 90° phase winding 70 of the reference alternator 41.

As explained above, errors may also be introduced due to the rotary transformer or magnetic slip ring operation. Compensation for these errors is effected by means of utilizing additional circuit elements on the stator in a manner to be described.

The modulation in the output rotary transformer 36 involves magnetic flux in the air gap so that any means by which the air gap flux can be nulled will prevent this undesired modulation. It is equally effective to null the flux by a change in the magnetomotive force (MMF) on the rotor 40 or on the stator 38. Thus, a tertiary winding 75 can be added to the stator 38 and a current established in this winding which is correct in phase and amplitude to produce an MMF which exactly cancels the MMF due to current in the rotor coil 40 so that the net MMF across the air gap is reduced to zero. The only difficulty with this procedure results from leakage coupling between the tertiary winding 75 and the signal output coil 38. There are two potentially undesirable effects from this leakage coupling; first, there will be a steady carrier voltage out of the transformer 36 which may saturate the electronic amplifier 62 and second, there is no basis for the user to adjust the current to the correct value to null the flux.

The present invention solves both of these problems when the tertiary winding 75 is so designed as to reduce the leakage coupling between it and the signal output coil 38 to zero. This can be accomplished by making the tertiary winding 75 in two parts, one part 76 coupled as tightly as possible to the output winding 38 (for example, wound as a bifilar coil) and a second part 77 as loosely coupled as possible with these two parts connected to make them oppose with respect to each other. When the bifilar winding 76 has substantially less turns than the loosely coupled winding 77, the overall winding 75 can have zero leakage coupling to the output coil 38 and yet retain the ability to change the MMF across the air gap. Furthermore, when the design is such as to make the leakage coupling zero, the output voltage will be equal to zero when the air gap flux is zero. Both of the desired conditions are then simultaneously obtained.

The above discussed design can be made to eliminate completely the effect of modulation in the output rotary transformer 36 by, in effect, providing for the final balancing of the transducer bridge circuit by use of circuit elements on the stator 38.

When modulation of the bridge excitation by the input rotary transformer 35 is considered, however, it is found that this is only a partial solution. To the extent that the input is modulated because of variations in input current acting on a nonzero source impedance, the correction as described is complete because both the rotating and nonrotating bridge elements are excited by the resultingly modulated voltage. If the input rotary transformer 35 modulates its secondary voltage for other reasons, however, there is no correction for this in the above discussed arrangement.

To reduce further the effect of the input rotary transformer 35, a tertiary winding 80 can also be included on its stator 37. As in the case of the output transformer tertiary winding 75, the winding 80 is made in a loosely coupled section 81 and a tightly coupled section 82 which are connected in series opposition with respect to each other to produce a net zero leakage coupling to the excited stator coil 37. The voltage on this tertiary winding 80 will be modulated almost exactly as in the rotor winding 39 no matter what the source of the modulation. Use of the resulting voltage to excite the external bridge elements of a bridge circuit 83 and adjustment of the bridge circuit 83 to produce a null output voltage at the output rotary transformer 36 will substantially eliminate all undesirable rotary transformer contributions to the bias of the gyroscope 25. The bridge circuit 83 comprises variable resistors $R_4$ and $R_5$ responsive to the output of the tertiary winding 80 which form two arms of the bridge circuit 83 and a resistor $R_6$ and a capacitor $C_4$ which form the remaining arms. The resistor $R_6$ and capacitor $C_4$ each have one terminal connected to the wiper arms of the respective variable resistors $R_4$ and $R_5$ and the other terminal connected together and to the tertiary winding 75 to form an adjustable RC network for nulling undesirable output voltages as explained above.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:
1. In a gyroscopic device:
 (a) a fluid,
 (b) means for containing said fluid in a substantially spherical cavity,
 (c) means for spinning said containing means about an axis thereof thereby also spinning said fluid,
 (d) means including pressure responsive means mounted exteriorly of said cavity and communicating by means of passages with said fluid for detecting the angular difference between the spin axis of said fluid and the spin axis of said containing means,
 (e) said passages being arranged in combination in a substantially figure eight configuration for reducing the undesirable effects due to angular acceleration and angular vibration.

2. In a gyroscopic apparatus of the character recited in claim 1 in which said passages are arranged with the area $a_1$ equal to the area $a_3$ where said area $a_1$ is substantially the projected area enclosed when starting from the center of said fluid and extending radially to the centerline of said passages and continuing along the centerlines to and including where said passages overlap to form the innermost portion of said figure eight and said area $a_3$ is substantially the projected area enclosed by a planar projection of the centerlines of said passages forming the outermost portion of said figure eight.

3. In a gyroscopic apparatus of the character recited in claim 1 in which said passages are arranged with the area $$a_3 = a_1 - \tfrac{1}{2} R^2 \sin \theta \cos \theta$$

where said area $a_1$ is substantially the projected area enclosed when starting from the center of said fluid and extending radially to the centerline of said passages and continuing along the centerlines to and including where said passages overlap to form the innermost portion of said figure eight and said area $a_3$ is substantially the projected area enclosed by a planar projection of the centerlines of said passages forming the outermost portion of said figure eight, R is the radius of said cavity, and $\theta$ is the colatitude angle of said passages.

4. In a gyroscopic apparatus of the character recited in claim 2 and further including phase sensitive networks for discriminating to substantially eliminate the undesirable effects due to angular vibration at twice spin frequency.

5. In a gyroscopic device:
 (a) a fluid,
 (b) means for containing said fluid in a substantially spherical cavity,
 (c) means for spinning said containing means about an axis thereof thereby also spinning said fluid,
 (d) means including pressure responsive means mounted exteriorly of said cavity and communicating by means of ports and passages with said fluid for detecting the angular difference between the spin axis of said fluid and the spin axis of said containing means,
 (e) said passages being so constructed and arranged that starting at the center of said spherical cavity and extending along radial lines to said ports forms a figure which when traversed on a plane defined by said center and radial lines beginning at a point and ending at the same point requires at least a portion of the traverse to be of a clockwise nature and at least another portion to be of a counterclockwise nature for reducing the undesirable effects due to angular acceleration and angular vibration.

6. In a gyroscopic apparatus of the character recited in claim 5 in which said passages are arranged with the area $a_1$ equal to the area $a_3$ where said area $a_1$ is substantially the projected area enclosed when starting from the center of said fluid and extending radially to the centerline of said ports and continuing along the centerlines of said passages to and including where said passages overlap to form the innermost portion of said figure and said area $a_3$ is substantially the projected area enclosed by a planar projection of the centerlines of said passages forming the outermost portion of said figure.

7. In a gyroscopic apparatus of the character recited in claim 5 in which said passages are arranged with the area $$a_3 = a_1 - \tfrac{1}{2} R^2 \sin \theta \cos \theta$$

where said area $a_1$ is substantially the projected area enclosed when starting from the center of said fluid and extending radially to the centerline of said ports and continuing along the centerline of said passages to and including where said passages overlap to form the innermost portion of said figure and said area $a_3$ is substantially the projected area enclosed by a planar projection of the centerlines of said passages forming the outermost portion of said figure, R is the radius of said cavity, and $\theta$ is the colatitude angle of said ports.

8. In a gyroscopic apparatus of the character recited in claim 6 and further including phase sensitive networks for discriminating to substantially eliminate the undesirable effects due to angular vibration at twice spin frequency.

References Cited

UNITED STATES PATENTS

| | | | |
|---|---|---|---|
| 1,841,606 | 1/1932 | Kollsman | 74—5 |
| 3,058,359 | 10/1962 | Wing | 74—5.6 |
| 3,083,578 | 4/1963 | Rosato et al. | 74—5.6 |
| 3,200,653 | 8/1965 | Wing | 74—5.6 |
| 3,320,815 | 5/1967 | Bowles | 74—5 X |
| 3,320,816 | 5/1967 | Johnston | 74—5.6 |
| 3,323,377 | 6/1967 | Fraiser et al. | 74—5 X |

FOREIGN PATENTS 1,357,815  11/1964  France.

FRED C. MATTERN, *Primary Examiner.*

M. ANTONAKAS, *Assistant Examiner.*